(No Model.)
T. C. CHURCHMAN.
CAR WHEEL AND AXLE.
No. 422,727. Patented Mar. 4, 1890.
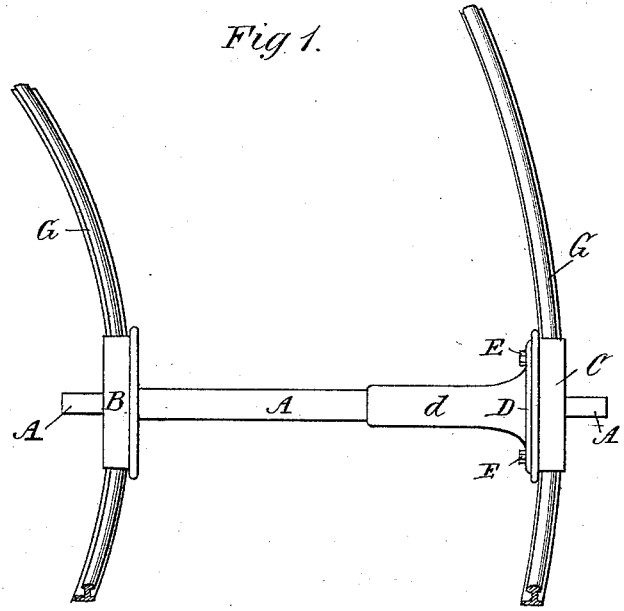
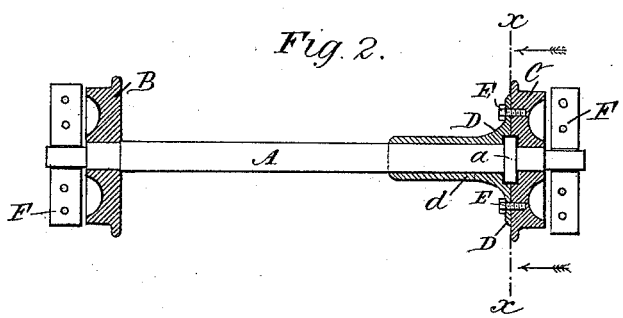
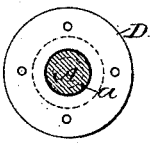
WITNESSES:
Paul Johot
C. Sedgwick
INVENTOR:
T. C. Churchman
BY Munn & Co.
ATTORNEYS.

UNITED STATES PATENT OFFICE.

THOMAS C. CHURCHMAN, OF SACRAMENTO, CALIFORNIA.

CAR WHEEL AND AXLE.

SPECIFICATION forming part of Letters Patent No. 422,727, dated March 4, 1890.

Application filed August 8, 1889. Serial No. 320,106. (No model.)

*To all whom it may concern:*

Be it known that I, THOMAS C. CHURCHMAN, of Sacramento, in the county of Sacramento and State of California, have invented a new and useful Improvement in Car Wheels and Axles, of which the following is a full, clear, and exact description.

My invention relates to wheels and axles of railway-cars, street-cars more particularly; and it has for its object to provide axles and wheels of this class which will enable cars mounted on them to round more or less sharp curves of the track to the right or left hand with minimum friction and draft.

The invention consists in certain novel features of construction of the car wheels and axle, all as hereinafter described and claimed.

Reference is to be had to the accompanying drawings, forming a part of this specification, in which similar letters of reference indicate corresponding parts in all the figures.

Figure 1 is a plan view of a pair of car wheels and an axle made in accordance with my invention and resting on a curve of a railway-track. Fig. 2 is a plan view of the axle and its lower bearings and a horizontal section of the car-wheels; and Fig. 3 is a transverse section of the axle at its collar and an outer face view of the loose-wheel disk-plate sleeve, taken on the line $x$ $x$ in Fig. 2.

The axle A has fixed to it in any approved manner one wheel B; but the other wheel C is placed loosely on the axle and is held thereto by means of a disk-plate D, which is provided with an elongated sleeve $d$ and is loose upon the axle. The inner face of the wheel C and the outer face of the sleeve disk-plate D are provided with annular opposing recesses which receive a collar $a$, fixed to the axle, and whereby when the sleeve disk-plate D is slipped onto the axle at the inner face of the collar $a$ and the wheel C is slipped onto the axle at the other side of the collar and the disk-plate and wheel are fastened together by bolts E the wheel disk-plate and sleeve will be held against endwise movement, but will be free to rotate together on the axle, while the opposite fixed wheel B will always rotate with the axle. With this construction it is manifest that as the wheels and axle, held to a car-body by any suitable bearings F F, are running around a curve of a railway-track G G to the right or left hand the loose wheel C and the connected disk-plate and sleeve D $d$ will allow free axial movement of the axle A in them, or will be allowed free rotative movement on the axle to compensate for the difference in length of the two rails of the track, while on a straight track the axle and wheel C and disk-plate and sleeve D $d$ will rotate together. The long sleeve $d$ of the disk-plate, in connection with the collar $a$ of the axle, holds the loose wheel C steadily on the axle, so that the wear is reduced to a minimum and durability is assured. When rounding curves at high speed, the free movement of the axle in the wheel C or of this wheel on the axle will greatly lessen the danger of the car jumping the track, and will also obviate the tendency of the wheels to wear flat in places at their tires or peripheries.

It is not essential that the axle-collar be fitted in a recess or bearing formed partly in the loose wheel and disk-plate, as the collar may be fitted in a recess or bearing formed wholly in either the wheel or the disk-plate; but the construction shown and above described is preferred in practice.

I am aware that a car-axle has had one fixed and one loose wheel. The loose wheel was held on the axle by means of a longitudinally-divided sleeve, the parts of which were bolted together around the axle and provided with a circular recess inclosing an annular rib on the axle. My sleeve is in one part, thereby avoiding the use of bolts, and my wheel is recessed to receive a part of said annular axle-rib, and thereby any lateral strain due to inclination of the wheel at times will be taken from the sleeve and its attaching-bolts.

Having thus described my invention, what I claim as new, and desire to secure by Letters Patent, is—

In car wheels and axles, the combination, with the axle A, having a fixed collar $a$, of a wheel C, loose on the axle, and a sleeved plate D $d$, bolted to the inner face of the wheel C, said collar $a$ being fitted into a recess or bearing formed partly in the loose wheel and sleeved plate, substantially as herein set forth.

THOMAS C. CHURCHMAN.

Witnesses:
WILBUR F. GEORGE,
H. M. LARUE, Jr.